(12) United States Patent
Pandey et al.

(10) Patent No.: US 12,710,879 B2
(45) Date of Patent: Aug. 18, 2026

(54) TECHNIQUE FOR IMPROVING OPLOG FLUSHING

(71) Applicant: Nutanix, Inc., San Jose, CA (US)

(72) Inventors: Abhineet Pandey, Sangrur (IN); Rohit Jain, New Delhi (IN); Shubham Shukla, Bhopal (IN)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 18/814,054

(22) Filed: Aug. 23, 2024

(65) Prior Publication Data

US 2025/0390223 A1 Dec. 25, 2025

(30) Foreign Application Priority Data

Jun. 21, 2024 (IN) ............................ 202441047851

(51) Int. Cl.
*G06F 3/06* (2006.01)

(52) U.S. Cl.
CPC .......... *G06F 3/0613* (2013.01); *G06F 3/0656* (2013.01); *G06F 3/0673* (2013.01)

(58) Field of Classification Search
CPC ..... G06F 3/0613; G06F 3/0656; G06F 3/0673
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
8,863,124 B1 10/2014 Aron et al.
9,009,106 B1 4/2015 Aron et al.
9,069,708 B2 6/2015 Gill et al.
9,336,132 B1 5/2016 Aron et al.
9,519,540 B2 12/2016 Atkisson et al.
9,606,918 B2 3/2017 Sterns et al.
9,652,265 B1 5/2017 Narayanasamy et al.
9,747,287 B1 8/2017 Bhardwaj et al.
9,772,866 B1 9/2017 Aron et al.
10,089,227 B1 * 10/2018 Subramanian ...... G06F 12/0891
10,210,082 B2 * 2/2019 Patel .................... G06F 3/0619

(Continued)

OTHER PUBLICATIONS

"2009 USENIX Annual Technical Conference reports," vol. 34, No. 5, dated Oct. 2009, pp. 81-100.

(Continued)

*Primary Examiner* — Edward J Dudek, Jr.
(74) *Attorney, Agent, or Firm* — Cesari and McKenna, LLP

(57) ABSTRACT

An improved flushing technique controls a draining speed of data from a temporary storage tier to a backend storage tier of a node so that draining logic does not overwhelm an input/output (I/O) workload that is serviced by the storage tiers. Illustratively, the temporary storage tier is a persistent write buffer embodied as an operations log (oplog) and the backend storage tier is persistent physical disk storage embodied as an extent store. The technique improves an oplog flushing algorithm by enabling control of the oplog draining speed (rate) to provide consistent performance when the I/O workload (e.g., a primary ingest I/O stream) is serviced by the extent store and/or oplog during one or more states (e.g., static inertia state, idle state and rebuild state) of the oplog.

36 Claims, 7 Drawing Sheets

(56) References Cited

U.S. PATENT DOCUMENTS

| | | | | |
|---|---|---|---|---|
| 10,452,553 | B1 * | 10/2019 | Mahajan | G06F 3/065 |
| 10,678,436 | B1 | 6/2020 | Jiang et al. | |
| 11,347,636 | B2 | 5/2022 | Chanler et al. | |
| 11,586,391 | B2 | 2/2023 | Tatiparthi et al. | |
| 11,829,328 | B2 | 11/2023 | Gupta et al. | |
| 11,954,372 | B2 | 4/2024 | Tatiparthi et al. | |
| 2009/0172286 | A1 * | 7/2009 | Lasser | G06F 12/0804 711/E12.001 |
| 2009/0228660 | A1 * | 9/2009 | Edwards | G06F 12/0866 711/E12.022 |
| 2011/0191534 | A1 * | 8/2011 | Ash | G06F 12/0868 711/E12.019 |
| 2012/0124294 | A1 * | 5/2012 | Atkisson | G06F 12/0804 711/135 |
| 2013/0132667 | A1 * | 5/2013 | Benhase | G06F 12/0802 711/E12.019 |
| 2016/0344834 | A1 * | 11/2016 | Das | H04L 67/1097 |
| 2019/0042146 | A1 * | 2/2019 | Wysoczanski | G06F 12/0846 |
| 2020/0151099 | A1 * | 5/2020 | Gerhard | G06F 12/0868 |
| 2021/0397360 | A1 * | 12/2021 | Vankamamidi | G06F 9/4881 |
| 2022/0309010 | A1 | 9/2022 | Jiang et al. | |
| 2022/0358087 | A1 | 11/2022 | Gupta et al. | |
| 2023/0359359 | A1 | 11/2023 | Chilton | |
| 2024/0143462 | A1 | 5/2024 | Jain | |
| 2024/0329848 | A1 * | 10/2024 | Roy | G06F 3/067 |

OTHER PUBLICATIONS

Cano, Ignacio, "Curator: Self-Managing Storage for Enterprise Clusters" University of Washington; published Mar. 2017; pp. all.

"Chapter 14: The InnoDB Storage Engine" retrieved on Aug. 22, 2024 from http://www.asktheway.org/official-documents/mysql/refman-5.6-en.html-chapter/innodb-storage-engine.html, pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Jul. 23, 2024, pp. all.

Slides "STOW: Spatially and Temporally Optimized Write Caching Algorithm" by Gill et al., IBM Almaden Research Center, 2009, 21 pages.

VMware Manual—"Troubleshooting vSAN Performance, VMware Storage," Copyright 2005-2024, 53 pages retrieved Aug. 13, 2024 from VMware The Cloud Platform Tech Zone at https://core.vmware.com/resource/troubleshooting-vsan-performance#_Toc536646878, 53 pages.

* cited by examiner

TECHNIQUE FOR IMPROVING OPLOG FLUSHING

CROSS-REFERENCE TO RELATED APPLICATION

The present application claims the benefit of India Provisional Patent Application Serial No. 202441047851, which was filed on Jun. 21, 2024, by Abhineet Pandey et al. for SMART TECHNIQUE FOR IMPROVING OPLOG FLUSHING, which is hereby incorporated by reference.

BACKGROUND

Technical Field

The present disclosure relates to forwarding (draining) of data among storage tiers of a compute node and, more specifically, to controlling draining speeds of the data among the storage tiers of the node.

Background Information

A node may be configured to provide compute and storage services for information, i.e., data such as files, on storage devices organized as one or more storage tiers. A user running client software (e.g., an application) may access the information stored in a file using input/output (I/O) accesses in accordance with filesystem protocols. Typically, these protocols specify that the node should not send a reply, e.g., an acknowledgement, to an application issuing I/O accesses such as write operations with data to the file until that data is stored on persistent storage media as provided by a backend storage tier communicating with the node. To reduce backend storage tier latencies, a write buffer may be used to allow acknowledgement of the write operations (writes) as soon as the data are recorded in the buffer, thereby deferring processing of the writes to the backend storage tier. Since the write buffer is not intended as a final resting place for data, the data is flushed, i.e., drained (forwarded), from the write buffer for final storage on the backend storage tier. However, there may be various limits imposed on the write buffer based on existing usage and capacity as well as backend I/O usage that may impact an efficient flushing or draining speed of the buffer.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
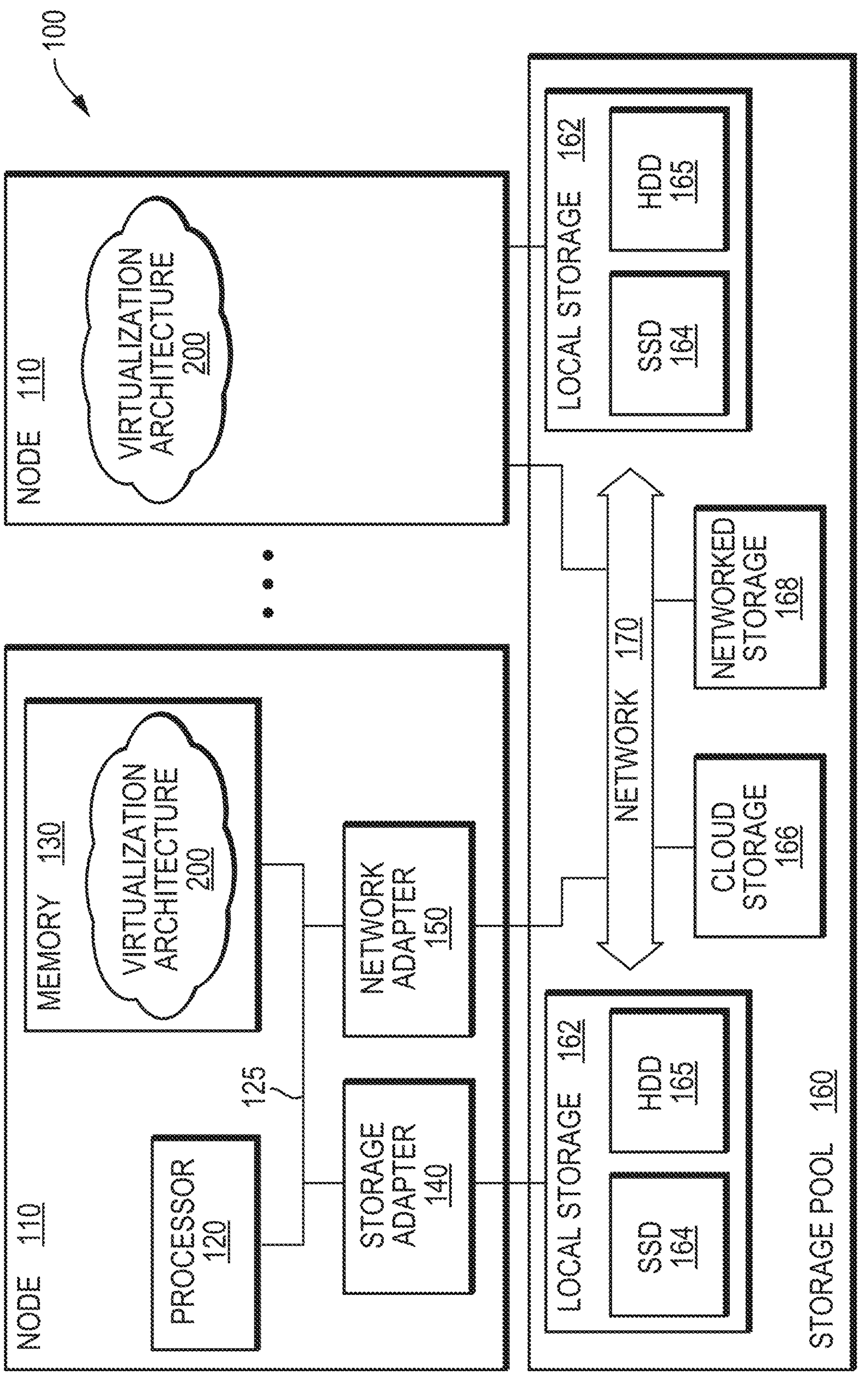
FIG. 1 is a block diagram of a plurality of nodes interconnected as a cluster in a virtualized environment.

The embodiments described herein are directed to an improved flushing technique configured to control a draining speed of data from a temporary storage tier to a backend storage tier of a node so that draining logic does not overwhelm an input/output (I/O) workload that is being serviced by the storage tiers. Illustratively, the temporary storage tier is a persistent write buffer embodied as an operations log (oplog) and the backend storage tier (layer) is persistent physical disk storage embodied as an extent store. The technique improves an oplog flushing algorithm by enabling control of the oplog draining speed (rate) to provide consistent performance when the I/O workload (e.g., a primary ingest I/O stream) is serviced by the extent store and/or oplog during one or more states (e.g., static inertia state, idle state and rebuild state) of the oplog. That is, the technique manages oplog flushing to the extent store according to the state of the oplog to maintain I/O workload performance. In each state, a different controller may be used to regulate the oplog flushing opportunistically, e.g., during the idle state, oplog flushing may be aggressive as random write I/O workload is low to nonexistent whereas, during a rebuild state, the oplog is busy with internal I/O as well as possible random write I/O workload requiring an overall careful regulation of flushing.

In an embodiment, the technique improves oplog flushing during the static inertia state (e.g., a state where the I/O workload includes random writes stored by the oplog which are then drained to the extent store) of the oplog with the use of a predictor and a proportional, integral, and derivative (PID) controller. Illustratively, the predictor is configured to predict a peak amount of oplog storage usage based on a current oplog storage usage as modified according to a current ingest (I/O workload writes) speed to the oplog (e.g., a rate of added data fragments corresponding to new data ingested/written into oplog), as well as a current draining/flushing speed of the oplog (e.g., a rate of drained data fragments corresponding to data flushed from the oplog to the extent store). The predicted peak oplog storage usage is then provided (fed forward) to a PID controller configured to control the draining/flushing speed (e.g., regulate the speed up or down) to ensure that predicted peak storage usage is substantially close to a desired (predetermined) peak oplog storage usage, wherein the predetermined peak oplog storage usage is computed based on (i) a pre-configured amount of consumed storage space (e.g., for each virtual disk) at the extent store or (ii) when a number of virtual disks (vdisks) exceeds a threshold (e.g., a number of vdisks is high), based on dividing a cluster-wide oplog storage capacity into a cluster-wide vdisk capacity in proportion to respective workload requirements for each vdisk.

The technique also improves idle state (e.g., a state where the I/O workload has little to no random writes sent to the oplog for a period of time) draining by accounting for (acting upon or managing) all types of active (frontend) I/O workload operations (i.e., sequential and random write operations, as well as read operations) occurring to the extent store and the oplog during the idle state of the oplog to ensure that the oplog is not excessively drained/flushed as long as active frontend I/O workloads are present. Notably, more aggressive oplog flushing may be permitted when random writes are absent from the frontend I/O workload. A characterizer may be used to separate random writes destined for the oplog from sequential writes that are passed through to the extent store. Consideration of the I/O operation types is needed because draining of data from the oplog to the extent store (physical storage) requires compute resources which can impact other I/O operations in the system. Notably, the technique adjusts the oplog draining speed (rate) during idle oplog activity based on the length of time the oplog has been idle.

Moreover, the technique provides yet two more embodiments for improving a data rebuild process during the rebuild state (e.g., oplog rebuild operation). In a first such embodiment, a step function ("incremental slab" based on oplog storage media utilization) approach initiates the oplog draining at a low draining speed that is maintained constant for some time. The draining speed then increases, e.g., after every fixed time interval (N minutes), to drain at a higher rate. Once a predetermined maximum time threshold is reached, the technique starts draining at an aggressive speed to guarantee that the drain rebuild flushing completes. The incremental slab approach proceeds until either a predetermined maximum draining speed for rebuild is reached or the oplog rebuild completes.

In a second such embodiment for improving data rebuild, a service may be configured to orchestrate extent store rebuild and maintain an estimate of how long the rebuild will take based on the amount of data to rebuild and rebuild speed. Based on the current draining speed of the oplog (including derivative and integral of the draining speed for the PID controller), the technique determines how long it will take to drain the oplog. The technique then leverages the estimation of how long the extent store rebuild will take as computed by the service. If the oplog draining may complete before an extent store rebuild, the technique reduces the draining speed of the oplog to reduce impact on the extent store rebuild and, more notably, on frontend I/O workload. If the oplog draining may complete after (slower than) the extent store rebuild completes, the technique increases the draining speed so that the oplog does not lag the extent store rebuild completion. That is, the objective of the data rebuild improvement is to complete oplog draining and extent store rebuild in close temporal proximity so as to avoid impacting frontend I/O workload performance, especially when I/O capacity increases after rebuild is complete.

DESCRIPTION

FIG. 1 is a block diagram of a plurality of nodes 110 interconnected as a logical or physical grouping of nodes such as, e.g., compute nodes of a cluster 100, and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 and a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be affected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
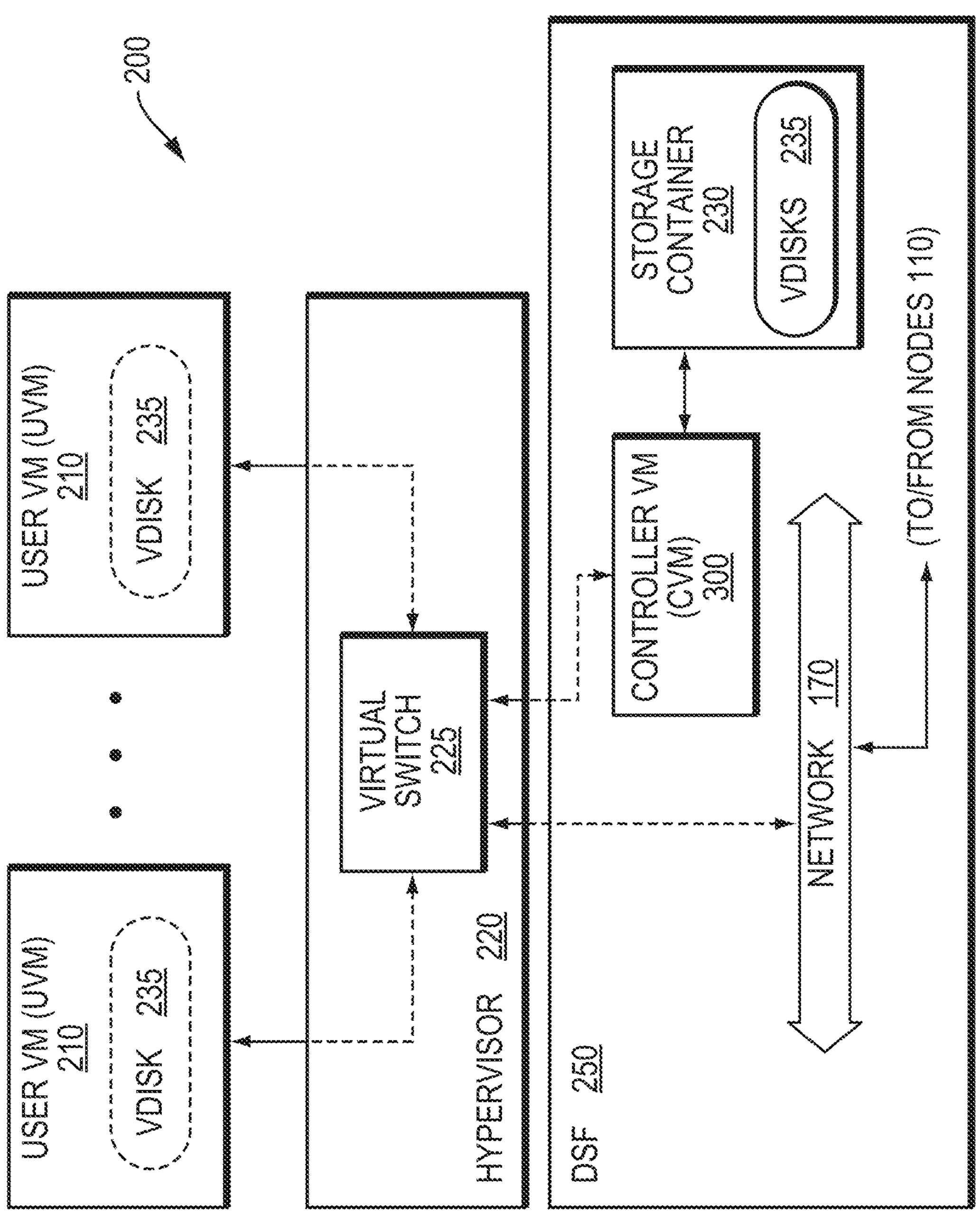
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (ISCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an ISCSI, CIFS, or NFS request as part of its hardware emulation layer. As previously noted, a virtual SCSI disk attached to the UVM 210 may be embodied as either an iSCSI LUN or a file served by an NFS or CIFS server. An ISCSI initiator, SMB/CIFS or NES client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
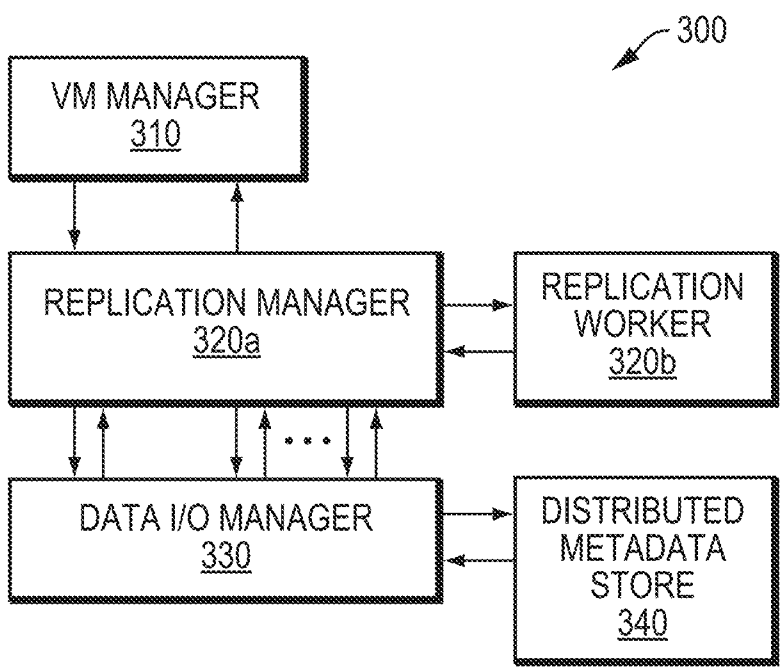
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., ISCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node, A replication manager **320*a* is configured to provide replication and disaster recovery capabilities of DSF 250. Such capabilities include migration/failover of virtual machines and containers, as well as scheduling of snapshots. In an embodiment, the replication manager 320*a* may interact with one or more replication workers 320***b*. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
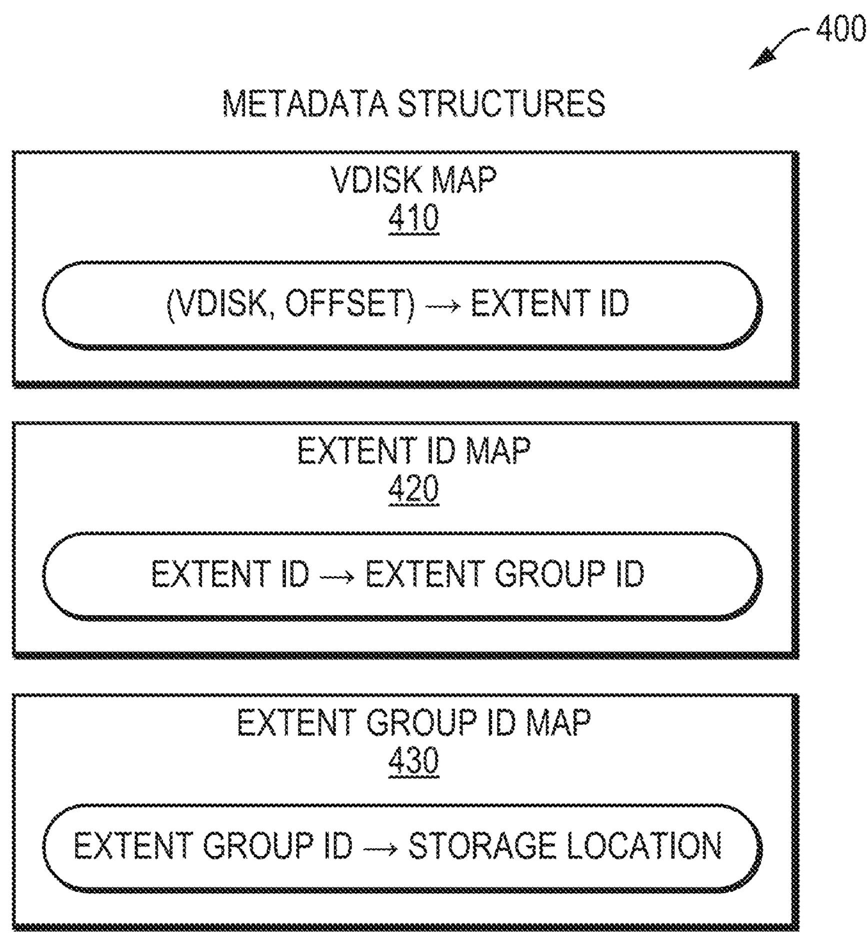
FIG. 4 is a block diagram of metadata structures used to map virtual disks (vdisks) of the virtualization architecture.

FIG. 4 is a block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, e.g., 1 MB, corresponding to a virtual address space of the vdisk that is used as the basis of metadata block map structures (maps) described herein. The data in each vblock is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices, which may be further organized as an extent store.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5:
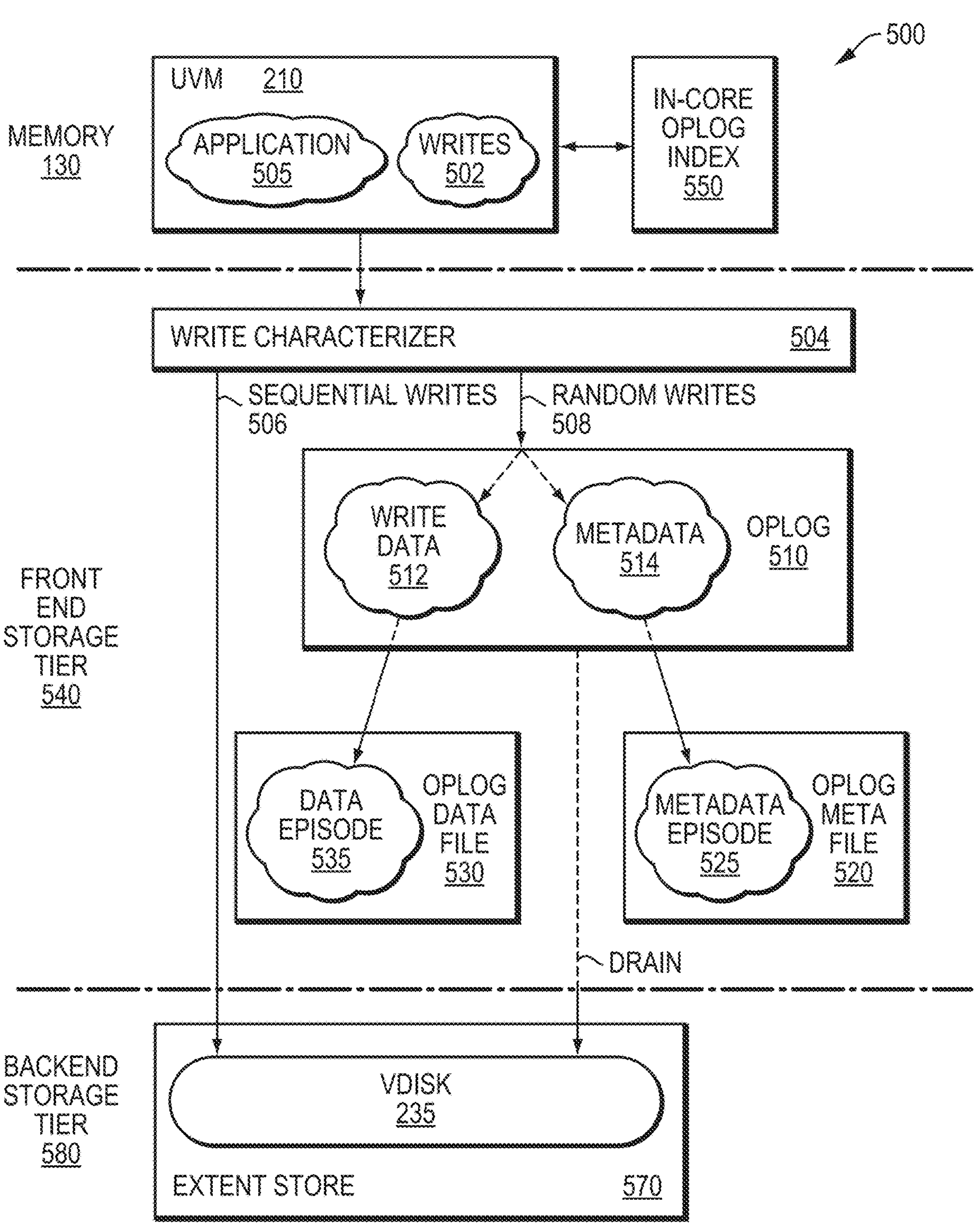
FIG. 5 is a diagram illustrating an exemplary input/output (I/O) path of the virtualization architecture.

FIG. 5 is a diagram illustrating an exemplary input/output (I/O) path 500 of the virtualization architecture. An application 505 running in UVM 210 issues I/O accesses, such as write operations (writes) 502, to vdisk 235 exported from a backend storage tier 580 organized as an extent store 570 of DSF 250. The writes 502 are received at a write characterizer 504, e.g., of data I/O manager 330. Illustratively, writes 502 are characterized based on write pattern and either (1) forwarded by the write characterizer 504 directly to the vdisk 235 as sequential writes 506 on the extent store 570 (e.g., larger block sequential writes resulting in pending queue sizes above a threshold); or (2) temporarily stored (cached) as random writes 508 (and smaller block sequential writes resulting in pending queue sizes below the threshold) at a log illustratively embodied as an operations log (oplog) 510, coalesced and sequentially drained to the extent store 570 (e.g., large block random writes). Note that the pending queue size threshold used to characterize the writes may be adjusted (e.g., lowered) as data stored in the oplog reaches capacity so that more writes 502 are forwarded directly to the extent store bypassing storage in the oplog. The oplog 510 functions as a staging area to coalesce the random writes 508 as a batch for periodic forwarding (draining) in a single operation to the extent store 570. In an embodiment, there is one oplog 510 associated with each vdisk 235, wherein the oplog 510 is persistently stored by the storage stack of the CVM 300 within a fast frontend storage tier 540 of DSF 250, e.g., on non-volatile memory express (NVMe) storage devices. Persistent storage of the oplog 510 on the frontend tier 540 enables fast acknowledgment of the random writes 508 issued by the application 505 running in UVM 210. In essence, the write characterizer 504 cooperates with the oplog 510 to manage the latencies (e.g., acknowledgement latency and backend storage latency) associated with the random writes 508.

Illustratively, the oplog 510 caches (captures) the data associated with the random writes (i.e., write data 512) and the metadata 514 describing the write data. The metadata 514 includes descriptors (e.g., pointers) to the write data 512 corresponding to virtual address regions, i.e., offset ranges, of the vdisk 235 and, thus, are used to identify the offset ranges of write data 512 for the vdisk 235 that are captured in the oplog 510. The captured metadata 514 of the oplog 510 is batched (collected) into one or more groups of predetermined size or number of entries, e.g., 250 KiB or 5000 entries, and recorded as one or more incremental images (metadata episodes 525) of metadata records in an oplog metafile 520 on the frontend storage tier 540. Similarly, the captured write data 512 may be grouped to a predetermined size, e.g., 500 MB, and recorded as one or more data episodes 535 of data in an oplog data file 530 on the frontend storage tier 540. Each episode of the oplog data and metafiles is marked with a timestamp identifier (ID) (i.e., a timestamp used as an identifier).

In an embodiment, the episodes of the oplog data file 530 and oplog metafile 520 are replicated across one or more nodes 110 (e.g., a primary node and a secondary node) of the cluster 100 according to a replication factor (RF) algorithm used for vdisk replication to ensure global redundancy protection and availability of data in the cluster. Illustratively, the data I/O manager 330 is a data plane process configured to perform a data and metadata replication procedure between, e.g., a primary node and a data I/O manager "peer" on a secondary node. To that end, the data I/O manager 330 may employ remote direct memory access (RDMA) capabilities integrated in its code path used for vdisk replication in accordance with RF data protection to replicate the oplog data and metadata episodes across the nodes. Note that additional information may be stored on the distributed metadata store 340, such as (i) the node locations of the oplog metafiles (including RF replicas) for the replicated vdisk as well as (ii) IDs denoting beginning and ending (e.g., lowest and highest timestamps) of valid records in the episodes of those files. Durable storage of such information facilitates replication of the metadata episodes 525 from the primary node to the secondary node.

To facilitate fast lookup operations of the offset ranges when determining whether write data 512 is captured in the oplog 510, a data structure, e.g., binary search tree such as a B (B+) tree, is embodied as an oplog index 550 configured to provide a state of the latest data at offset ranges of the vdisk 235. Notably, the oplog index 550 is stored in memory 130, i.e., dynamic random access memory (DRAM), of node 110 to provide an in-core representation of the oplog metafile 520 that may be examined to quickly determine the offset ranges for the latest data written to the vdisk 235. Instead of performing a sequential read operation (read)

through the oplog metafile 520 to determine offset ranges for random writes 508 captured in the oplog 510, the in-core oplog index 550 may be examined (i.e., searched) to quickly determine the offset ranges corresponding to the latest data written to the vdisk 235.

As the random writes 508 of the metadata episodes 525 are periodically drained to the extent store 570, e.g., by draining logic embodied as a background process, the oplog metafile 520 associated with the drained writes is deleted (garbage collected) from the frontend storage tier 540. The data I/O manager 330 may send the appropriate metadata episodes 525, e.g., via a remote procedure call, to the secondary node in accordance with the replication procedure. Alternatively, the data I/O manager 330 may send the IDs of the metadata episodes 525 to the secondary node, which may then fetch appropriate node location information of the metadata records of the metadata episodes 525 from the distributed metadata store 340 to enable retrieval of the metadata records from the extent store 570. In either case, a representation of the in-core oplog index 550 is conveyed (i.e., the episode metadata records of the oplog metafile) between the nodes, such that the secondary node is constantly receiving the metadata needed to build (or update) the in-core oplog index 550 at the secondary node. Once the metadata episodes 525 are applied to the in-core oplog index 550, the information relating to the episodes may be deleted from the distributed metadata store 340.

In the event of a primary node failure/crash, the in-core oplog index 550 may be recovered (rebuilt) on the secondary node using either a copy (replica) of the oplog metafile 520 that was replicated on the secondary node in accordance with the RF data protection algorithm or the metadata episodes 525 stored on the extent store 570. Recovery may be implemented by replaying metadata records of the episodes 525 not yet applied to an existing oplog index starting from the beginning of the file and proceeding forwards to construct an up-to-date (i.e., at a time of the failover) copy of the oplog index data structure in memory of the secondary node. However, when recovering from scratch (i.e., not reconstructing from an existing oplog index), metadata records of the episodes 525 are applied from the end of the file and proceeding backwards to construct an up-to-date (i.e., at a time of the failover) copy of the oplog index. During recovery, I/O accesses, such as reads and writes, to the vdisk 235 may be suspended because of the inability to determine whether offset ranges of the I/O accesses overlap with random writes 508 captured in the oplog 510 while the oplog index is being constructed at the secondary node. Yet, suspension of I/O accesses may impact compute and storage service performance of the cluster 100.

In an embodiment, the oplog 510 initially includes one episode (the initial episode) configured to receive (log) new random writes 508. Upon reaching a threshold, the initial episode is closed and drained (e.g., by the draining logic), newer episodes may be opened, and subsequent random writes 508 are logged to records of those new episodes. Once its record contents are overwritten to a new episode or drained, the initial (oldest) episode may be deleted to perform garbage collection (GC). Deleting an episode frees up space in oplog; however, as noted, the oplog is a log-structured data structure that requires episodes be deleted in sequence (order), e.g., the oldest episode deleted first, even if a newer (subsequent) episode is "inactive" i.e., all records are either flushed or overwritten to newer episodes. That is, an episode can be deleted only when all the data in it (as well as all the data in older episodes) has been flushed to the extent store or has been overwritten in subsequent episodes or a combination of the two. The ordered sequence of deletion facilitates recovery, i.e., replay of all records of episodes in order.

In an embodiment, the records of the episode are organized as vblock numbers per user write offset range of a vdisk, e.g., the vdisk address space is divided into 1 MB vblock offset ranges. For example, a first record may be designated vblock 0 with a user write offset range (offset range) of 0-1 MB, a second record may be designated vblock 1 with an offset range of 1 MB-2 MB, and a third record may be designated vblock 10 with an offset range of 10 MB-11 MB. The latest (newest) write data for the vblocks of the oldest episode are collected (and their newer records nullified) from all of the episodes and flushed (drained) to the extent store 570 in one I/O transaction. For instance, write data from a 0-4K offset range may be collected from episode 1, write data from a 4K-8K offset range may be collected from episode 2, and write data from a 16K-32K offset range may be collected from episode 3 for a single flushing transaction to the extent store 570. Draining of latest write data in this manner reduces the number of updates to the metadata store 340 by coalescing and draining of the latest write data of particular vblocks to the extent store in a single transaction.

Often records in newer episodes are nullified as part of collecting and draining records of the oldest (e.g., initial) episode. Assume the initial episode has records representing (random) writes spread throughout the vdisk address range and included in a substantial number of (e.g., 5000) vblocks. As the initial episode is drained, records in newer episodes are nullified. When a newer episode becomes the oldest episode, that episode has fewer valid records compared to the initial oldest episode. Assume a certain number of episodes are opened and accumulated to reach the threshold and it is desired to start draining the initial (oldest) episodes. Deletion (GC) of the first two initial episodes may consume a long time (because they have many records) but because of record nullifications in the newer episodes, it may be possible to GC many newer episodes quickly that have similar numbers of fewer, non-nullified records.

The embodiments described herein are directed to an improved flushing technique configured to control draining speed of data from a temporary storage tier to a backend storage tier of a node so that draining logic does not overwhelm an input/output (I/O) workload that is serviced by the storage tiers. Illustratively, the temporary storage tier is a persistent write buffer embodied as oplog 510 and the backend storage tier (layer) is persistent physical disk storage embodied as extent store 570. The technique improves an oplog flushing algorithm by enabling control of the oplog draining speed (rate) to provide consistent performance when the I/O workload (e.g., a primary ingest I/O stream) is serviced by the extent store and/or oplog during one or more states (e.g., static inertia state, idle state and rebuild state) of the oplog. That is, the technique manages oplog flushing to the extent store according to the state of the oplog to maintain I/O workload performance. In each state, a different controller may be used to regulate the oplog flushing opportunistically, i.e., during the idle state, oplog flushing may be increased as workload I/O is low to nonexistent whereas, during a rebuild state, the oplog is busy with internal I/O as well as possible workload I/O leading to carefully regulated flushing.

In an embodiment, the technique may be implemented in the storage stack (e.g., data I/O manager 330) of the CVM 300 and is configured to intelligently flush/drain data from the oplog 510 to the extent store 570 during a static inertia state, an idle state and a rebuild request state of the oplog. To improve oplog data flushing, the technique provides separate solutions for each state of oplog 510. Improvements to the flushing process are focused on vdisk oplog physical storage usage (i.e., space consumed by oplog on the physical disk) based draining, idle state (i.e., no random write operations received at the oplog for a period of time) and rebuild (e.g., disk/node removal due to maintenance or failure), as well as an "oplog killer" (i.e., cluster-wide oplog capacity overload) workload wherein aggressive cluster-wide draining prevents cluster-wide oplog storage capacity from getting exhausted but adversely affects I/O performance significantly. Illustratively, an "oplog killer" workload issues sustained random write operations equally to a large number of vdisks 235 such that each vdisk's usage is small but, added together, the write operations to the vdisks hit cluster-wide physical thresholds for oplog, e.g., up to 400 GiB of SSD storage space per node (12 GiB per vdisk) is reserved for oplog.

The "vdisk oplog physical usage-based draining" refers to storage space consumed by the oplog 510 on physical storage (disk). In an embodiment, there are several different types of limits imposed per vdisk 235 (as well as cluster-wide) storage space consumption by oplog 510, namely (i) physical disk (physical usage), (ii) logical usage per vdisk (amount of live data in oplog), and (iii) index usage per vdisk (number of ranges in oplog index 550, which is a proxy for memory consumed by oplog index). The technique independently computes the draining speed based on calculated closeness/proximity to each of the limits and then takes a maximum of all the calculated draining speeds. Different I/O workloads may result in or hit (reach) different limits first based on the type of I/O activity, e.g., the index usage limit may be hit first when smaller 4K I/O operations are performed without much overwrites, whereas the logical usage limit may be hit first when greater than 8K I/O operations are performed without much overwrites and the physical usage limit may be hit first when there are a sufficient number of overwrites.

Static Inertia State

Static inertia state (where the I/O workload includes random writes stored by the oplog which are then drained to the extent store) occurs during physical usage-based draining when draining (flushing) is performed based on physical storage usage, i.e., when oplog storage usage is either close to the cluster-wide limit (e.g., in the oplog killer/over-capacity workload) or close to the per vdisk limit (e.g., if the I/O workload is performing many overwrites). Notably, oplog draining is a sufficiently compute (e.g., CPU) intensive process such that, when draining at a high speed, the I/O workload rate suffers due to lack of compute resources. In addition, the static inertia state exhibits a behavior that while rapidly draining in response to physical storage usage, the oplog 510 physical storage usage increases for a time period and then suddenly drops once an equilibrium between incoming I/O and oplog draining is achieved, even if draining is maintained at a constant rate, due to delays in GC (i.e., hysteresis to reclaim storage capacity in the oplog). Notably it is desirable to predict a peak usage threshold, at which point the physical usage will drop, so that a maximum amount of writes may be absorbed into the oplog before performance deteriorates.

Figure 6:
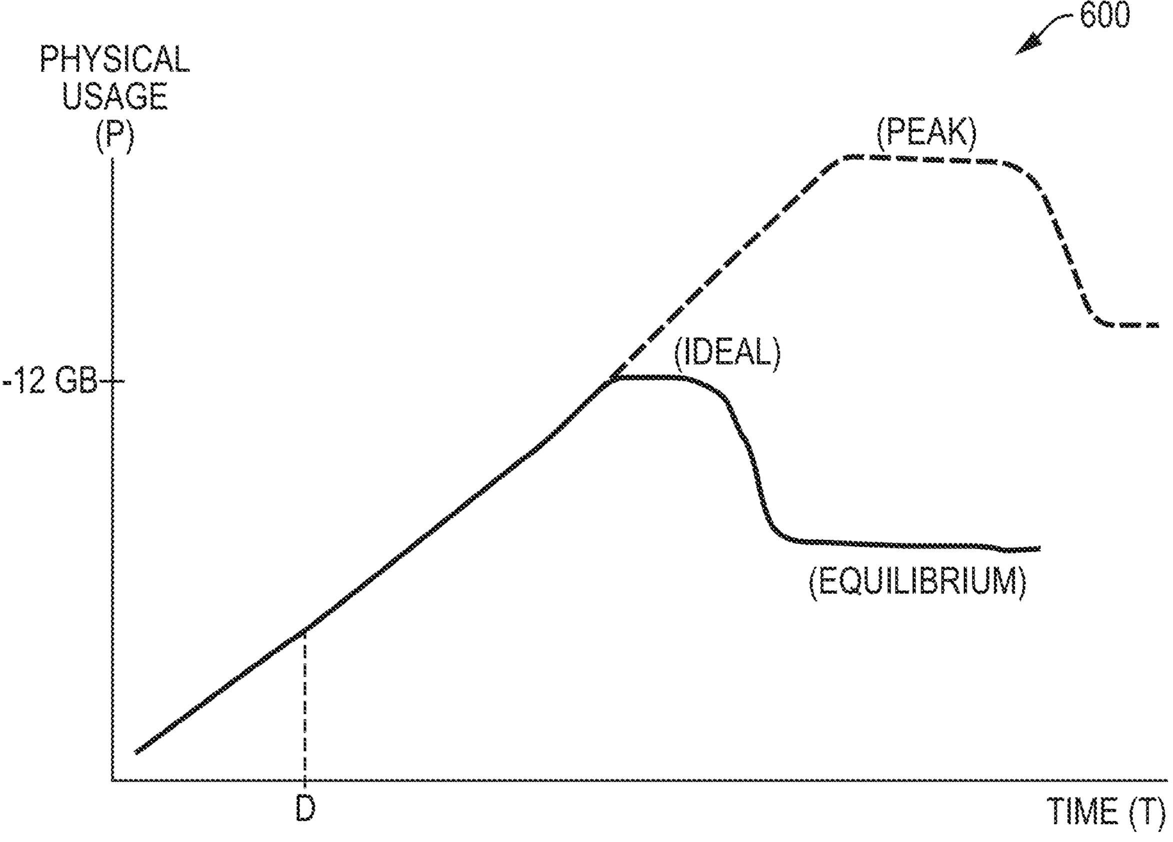
FIG. 6 is a diagram of a graph illustrating physical usage of an operations log (oplog) over time.

FIG. 6 is a diagram of a graph 600 illustrating physical usage of the oplog over time. As random writes 508 are logged and recorded to oplog 510, physical usage (P) increases with time (T) until draining (D) begins. Since writes continue to be logged in the oplog 510, physical storage usage continues to increase over time. However, the draining (flushing) process is unable to delete the data quickly (e.g., initial episodes) due to inefficiency in reclaiming storage by garbage collection. As a result, physical usage continues to increase (grow) at the same rate until there is sudden "dip" where initial episodes and a number of newer episodes can be deleted quickly (e.g., GC performance ramps sufficiently). Eventually the oplog 510 reaches a steady state (equilibrium) where the rate of draining the oplog and of ingesting new writes cancel each other. Notably, this is the "static inertia problem" due to time required for GC to begin showing effect even though draining had occurred earlier at an acceptable rate, as storage space on a relatively full device is not available until drained writes are reclaimed by GC.

In an embodiment directed to the static inertia problem, the draining speed is initially increased as the physical storage usage increases, e.g., start draining at 85% physical usage and linearly scale the draining speed to 100% in view of greater physical storage usage, to accumulate sufficient data to invoke GC once that data is drained. Illustratively, the physical storage usage is then checked at certain times after draining begins. If the physical storage usage continues to grow at substantially the same rate as draining, the draining rate (speed) is increased. Decreasing of the draining speed occurs when the physical storage usage is decreasing. Notably the trade-off between draining of the oplog 510 unnecessarily fast versus adversely impacting the I/O workload rate is impacted by physical storage usage because draining of the first few episode files takes much longer than the draining of subsequent episode files due to the delay in GC being effective to reclaim physical storage space for the oplog.

In addition, oplog draining may occur with less speed than required or at a greater speed depending on the I/O workload rate. For example, if I/O workload operations occur at a rate of x and draining of the oplog is merely proportional to physical storage usage, the desired (predetermined) peak usage may be exceeded or the oplog may become full, which could have been avoided if the rate x was monitored and determined to be high so that oplog draining should have occurred faster or earlier. The technique monitors the I/O workload rate as well as the oplog storage usage to predict peak oplog usage for greater efficiency as indicated in FIG. 6. A simple solution involves measuring (i.e., monitoring) the incoming (ingest) write rate (speed) and draining the oplog 510 at that same ingest speed. Eventually a leveling off (equilibrium) state will be reached that realizes the effect of draining. However, the problem with this simple solution is that it is unknown how high the peak oplog usage will be before the leveling off occurs. If the peak usage approaches the physical storage capacity of the oplog per vdisk (e.g., 12 GiB) before dropping off, aggressive draining may impact frontend I/O or may create many episodes which, if the node (CVM) crashes, will take a long time to recover.

Figure 7:
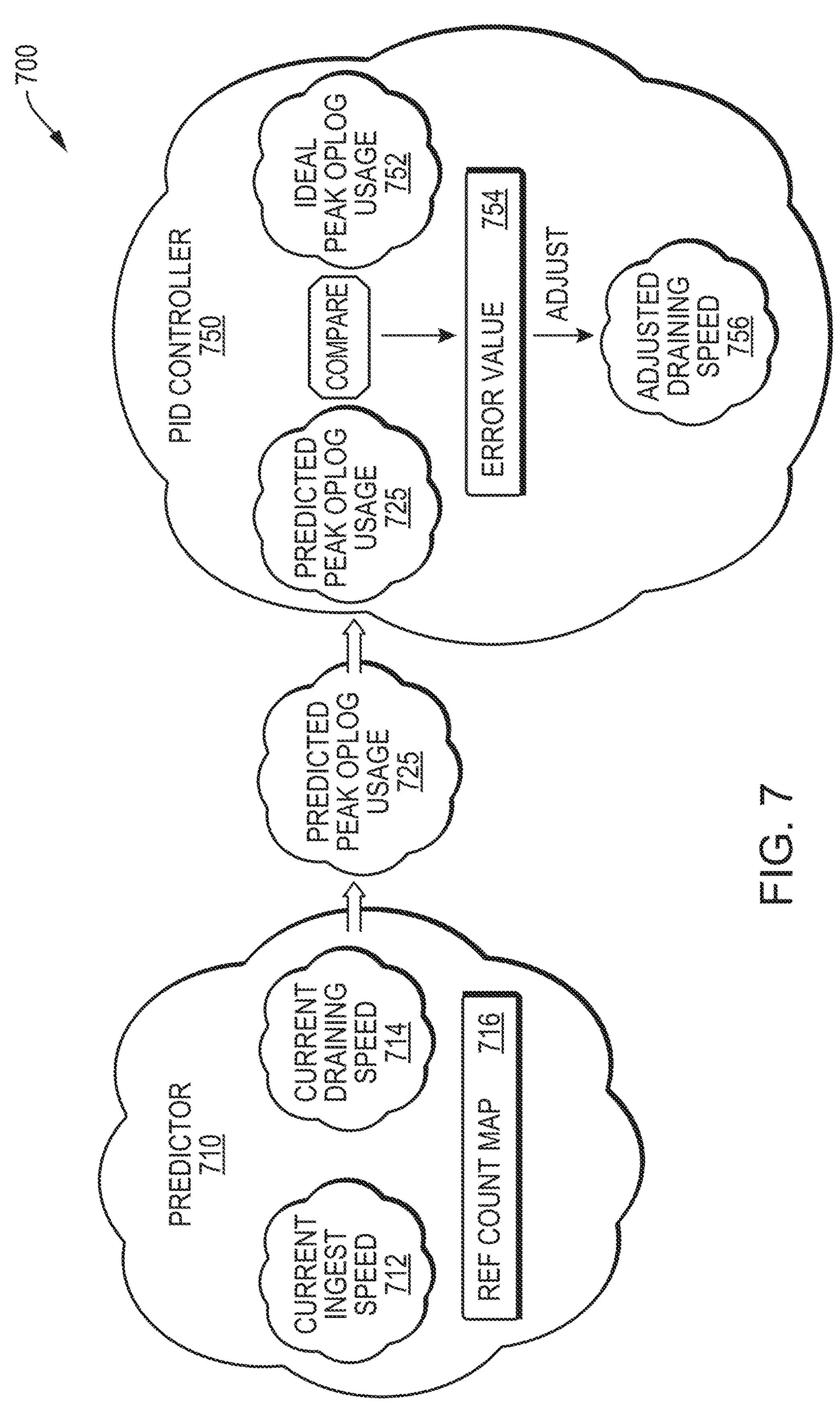
FIG. 7 is a block diagram of a predictor and controller of an improved oplog flushing technique.

In an embodiment, the technique improves oplog flushing during the static inertia state of the oplog with the use of a predictor 710 and a proportional, integral, and derivative (PID) controller 750. FIG. 7 is a block diagram of a predictor and controller of the improved oplog flushing technique. Illustratively, the predictor 710 is configured to predict a peak oplog usage 725 based on a current ingest (I/O workload) speed 712 of the oplog based on fragments (contiguous regions of data) of episode files (e.g., a rate of added data fragments corresponding to new data ingested/written into oplog) and a current draining (flushing) speed 714 of the oplog (e.g., a rate of drained data fragments corresponding to data flushed from the oplog to the extent store). The predicted peak oplog usage 725 is then provided (fed forward) to the PID controller 750 configured to control (regulate) the adjusted draining (flushing) speed 756 (e.g., regulate the speed up or down) to ensure that predicted peak storage usage 725 is substantially close to a desired (predetermined) peak oplog storage usage 752, wherein the predetermined peak oplog storage usage 752 is computed based on (i) a pre-configured amount of consumed storage space at the extent store 570, e.g., the storage space consumed by all of the vdisks 235, or (ii) when a number of vdisks exceeds a threshold (e.g., a number of vdisks is high), based on dividing a cluster-wide oplog storage capacity into a cluster-wide vdisk capacity in proportion to respective workload requirements for each vdisk.

In an embodiment, the predictor 710 is configured to predict the peak oplog usage with a set of parameters including (i) a fragment draining rate from a last (oldest) episode, (ii) a fragment draining rate from all but the oldest episode, (iii) a reference count (refcount) map 716 configured as a mapping of episodes to a number of live ranges of the episodes, e.g., at the current instance, and (iv) a rate of fragment addition. The rate of fragment addition takes into account insertions and the rate of fragment draining takes into account removals, whereas the refcount map 716 indicates the impact of the insertions and removals.

Specifically, the technique initially measures two (2) variables for the prediction of peak oplog usage 725: (i) a rate of record nullification (records drained from the oplog) in the oldest episode and (ii) a rate of record nullification in the other (newer) episodes, wherein records corresponds to data from an I/O workload write access. While draining, the rate of nullification of the oldest episode is faster than the average rate of nullification for the other episodes, as draining occurs in temporal order of the I/O workload to maintain semantic consistency. The technique counts the number of nullifications in the oldest episode and the number of nullifications in all of the other episodes which sum is divided by the number of other episodes to arrive at the average rate. Using the counted number of nullifications, the technique determines the length of time needed to drain the oldest episode and compute its nullification rate (e.g., number of nullifications per sec), as well as the nullification rate of the other episodes. For example, assume there are 5000 records in the other episodes. During the draining time period of the oldest episode, the number of valid records in the other episodes is reduced by the nullification rate (number of nullifications/sec) of the other episodes. After the oldest episode is drained and closed (deleted), the technique proceeds to the next episode file (now the oldest episode) and applies the oldest episode nullification rate to that file. The technique also periodically, e.g., every second, recomputes (updates) the parameters of a PID control loop.

Thus, the technique computes the predetermined peak oplog usage prediction based on nullification rates and actual sizes of episode files (e.g., records corresponding to I/O workload). While draining (flushing) the oldest episode, newer episodes are created and, as such, a third (3) variable illustratively relates to rate (and size) of new episode creation (e.g., based on MB/sec I/O bandwidth over the last second). An objective of the technique is to ensure draining occurs at the lowest possible rate while maintaining the actual peak oplog usage below the predetermined peak oplog usage (e.g., 12 GB per vdisk or global limit). As for the global limit, the available oplog storage space is determined in proportion to the current storage usage of each vdisk. Assume there are 10 vdisks spread over 5 VMs. For each VM, one vdisk is a boot disk and another vdisk is a DB disk. The physical usage of the oplog for the DB disk is higher than the boot disk, and the predetermined peak oplog usage may be adjusted accordingly.

In an embodiment, the predictor 710 is configured as computational logic organized as a loop that simulates draining of one episode during each iteration of the loop. After each iteration, the number of episodes remaining may be calculated by, e.g., the original number of episodes minus the drained episodes plus any newly added episodes. A time value representing the time taken to reach that particular point may also be determined (calculated) by accounting for the addition and removal rates based on the number of active references (reference count) in the refcount map 716. Illustratively, the time taken to drain the current episode (T1) may be calculated as an actual reference count for the current episode subtracting the average rate of fragment nullification (draining) of the prior episode multiplied by a total time taken to nullify (drain) prior episodes divided by the average rate of fragment nullification, wherein the time taken to nullify the prior episodes is their respective reference count divided by the average rate of nullification (draining) of fragments for those prior (oldest) episodes. The time value (T1) may be used (e.g., added) in further iterations to calculate when a particular episode may be drained. When the total number of episodes starts decreasing, the predictor 710 calculates the predicted peak oplog usage 725 using an average episode size.

In an embodiment, the PID controller 750 is configured to compare the predicted peak oplog usage 725 with an predetermined peak oplog usage 752 to generate an error value 754 used in the PID controller to adjust the (current) draining speed 756. The predetermined peak oplog usage 752 may be a per vdisk limit (e.g., 12 GB) although other limits (such as a global limit) may be used. If the predicted peak oplog usage 725 is less than the predetermined peak oplog usage 752, a negative error value is generated and used to decrease the current oplog draining rate. On the other hand, if the predicted peak oplog usage is greater than the predetermined peak oplog usage, a positive error is generated and used to increase the current oplog draining rate.

In an embodiment, the PID controller 750 is configured as a control system that utilizes the prediction provided by the predictor 710 to garner feedback and act upon the feedback in the context of error, e.g., predicted peak usage minus predetermined peak usage. If the predicted peak usage is higher than the predetermined peak usage, a positive error value is generated, whereas a negative error value is generated if the predicted peak usage is lower than the predetermined peak usage.

The technique modifies the adjusted draining speed 756 based on the error value 754. In an embodiment, the proportional ($P_{term}$) gain of the PID controller (control loop) denotes modifying the draining speed in proportion to the generated error value for fast (quick) realization of the actual peak oplog usage threshold. Integral ($I_{term}$) gain denotes modifying the speed in proportion to a sum of errors generated over time to correct (modify) any constant error. Thus, if the error remains constant despite continuously modifying the speed due to proportional gain, the integral gain further modifies the speed as the sum of errors continues to increase. Derivative ($D_{term}$) gain takes into account the rate of change of error to avoid oscillations around the predetermined peak oplog usage threshold, i.e., facilitate smoothing around the desired speed rather than overshooting and oscillating. Illustratively, the values of the control loop PID parameters are selected based on resource (memory, compute, I/O) capacity and rates. The control loop constantly runs once the physical oplog usage approaches or exceeds 50% to provide updates to the predicted usage every second.

The technique empirically determines the values (parameters) of the PID control loop, wherein the parameters are sufficiently robust for variations in rate (speed) and performance of the oplog. Essentially, an objective of the technique to drain at the lowest possible rate is to avoid an overflow condition (exceeding the predetermined peak oplog usage 752) and avoid a bottleneck at the extent store 570, as well as to avoid contention for resources such as compute (CPU) and metadata storage. In addition, draining impacts CPU contention used to log random writes at the oplog 510 and store sequential write I/Os to extent store 570. In sum, the technique addresses the static inertia problem using a prediction of peak oplog usage 725 provided to PID controller 750 to adjust the draining (rate) speed 756 of the oplog 510 to a desired (predetermined) peak oplog usage 752.

Idle Draining State

Idle draining involves "opportunistic draining" of the oplog 510 when in an idle state, i.e., no random write (I/O) operations are received at the oplog for a predetermined period of time (e.g., greater than 30 secs). Once its vdisk 235 is considered idle for the predetermined time period, draining of the oplog 510 starts at an aggressive draining speed, e.g., 5 fragments per second, to avoid oplog draining when I/O operations are received at the oplog, which results in contention of resources between the oplog and user workload. That is, if sufficient draining can occur during the idle state, oplog draining may not be needed during a time when the workload I/O (e.g., frontend I/O) operations are issued to the oplog. In essence, the idle state time shifts prior accumulated writes in the oplog to be drained during the idle state. However, such aggressive opportunistic draining using a simple oplog-related threshold determination (i.e., random writes 508 logged/recorded in the oplog 510) does not take into account other types of frontend I/O operations (such as sequential writes 506) flushed (issued) directly to the vdisk 235 (extent store 370) that also contend for compute and memory resources which may lead to I/O congestion at the extent store. As such, a sudden aggressive flushing may result in a bottleneck at the extent store 570 (and/or oplog 510) that impacts the I/O rates for all the other I/O operations and, consequently, system performance by, e.g., crashing the performance to as low as only 10% of the peak I/O rates.

Accordingly, the technique improves idle draining by accounting for types of active (frontend) I/O workload operations (sequential writes 506 and random writes 508, as well as reads) occurring to the extent store 570 and the oplog 510 during the idle state of the oplog to ensure that the oplog 510 is not substantially drained/flushed (i.e., the draining is paused) as long as active frontend workloads are present, i.e., active I/O that impacts the oplog such as random writes and reads with data in the oplog. Consideration of the I/O operation types is needed because draining of data from the oplog 510 to the extent store 570 (physical storage) requires compute resources which can impact other I/O operations in the system. The improved flushing technique adjusts the oplog draining speed (rate) during idle oplog activity based on a length of time the oplog has been idle. To avoid a sudden latency spike at a point in time when oplog draining starts, the technique may further employ a sliding window to regulate the oplog draining speed proportional to the last time an I/O operation was received at the oplog, e.g., drain the oplog linearly between a range of speeds depending on when the last frontend I/O workload operation was served. In an embodiment, the draining speed of the oplog is a function of the time period for which the oplog is idle (e.g., no frontend I/O). For example, if the oplog is idle for 10 secs, then draining occurs at a low speed (rate), but if the oplog is idle for 15 secs then the draining speed may increase linearly (i.e., proportionately with the assumption that the oplog may be idle for even longer). Accordingly, the sliding window may be fixed with respect to certain thresholds such as, e.g., at 10 secs of oplog idle time, draining occurs at a low rate of 0.1 fragments/sec and at 15 secs of idle time, the draining rate increases linearly to a draining speed of 5 fragments. Once drain (flush) operations begin during the idle periods of oplog activity, those flush operations take time to complete during which they consume compute and memory resources. If an I/O operation is received at the oplog during flushing, that I/O operation contends with the flush operations for the compute resources. However, it is likely that the I/O operations will manifest earlier at the oplog, which is why the draining speed is initially low and thereafter increases if there is no I/O activity at the oplog.

Rebuild State

Assume a node 110 or storage device (e.g., disk such as SSD 164) is taken offline and marked for removal due to, e.g., maintenance or failure. A sufficient number of data copies are maintained across the cluster to satisfy a cluster fault tolerance configuration, e.g., a replication factor (RF) data protection. To that end, a data rebuild (reconstruction) is needed that involves simultaneous action of rebuilding the oplog 510 and the extent store 570. An extent store rebuild is a time-consuming process (e.g., many hours) that involves copying one or more replicas of data to one or more new storage devices (SSDs) to fully replicate the data in accordance with the RF data protection. In contrast, an oplog rebuild is a faster process that involves draining almost the entire current content (episodes) of the oplog 510 to the extent store 570.

A prior approach to oplog rebuild drains (flushes) data from the oplog 510 at full speed (100% rate) for the vdisk 235 to ensure data protection (presence of RF replicas) even though the extent store rebuild takes a longer time to complete. A problem with this approach is that the full speed oplog flush may cause a sudden latency spike on frontend I/O operations that severely impact performance of the system, e.g., substantially impacts frontend user workload I/O operations as much as ten times. Yet despite how quickly the oplog is flushed, if the extent store 570 is not rebuilt as fast, data coherency (consistency) is incomplete. Also, such aggressive flushing (draining) of the oplog may increase the chance of another storage device failure.

During the data rebuild process, the prolonged extent store rebuild time may be leveraged to delay oplog flushing by draining more conservatively to obviate creation of the bottleneck impacting the incoming I/O operations. To that end, the oplog draining/flushing process is throttled, e.g., conservative draining/flushing of the oplog by an initial slow draining speed and then gradually (incrementally) increasing the oplog draining speed as oplog data rebuild progresses.

The improved oplog flushing technique provides two embodiments for improving a data rebuild process during the rebuild state. In a first such embodiment, a step function ("incremental slab" based on oplog storage media utilization) approach initiates the oplog draining at a low draining speed (e.g., 0.1 fragments/sec) that is maintained constant for some time. The draining speed then increases, e.g., after every fixed time interval (N minutes), to drain at a higher rate. Once a predetermined maximum time threshold is reached, the technique starts draining at an aggressive speed to guarantee that the drain rebuild flushing completes. The incremental slab approach proceeds until either a predetermined maximum draining speed for rebuild is reached or the oplog rebuild completes. In another variation of the first such embodiment, the technique can adjust the number of steps involved in the step function as well as the maximum time threshold for the entire step function to complete. It is undesirable to allow the oplog draining to exceed 30-45 mins since the extent store rebuild typically takes about 1 hour to complete (depending on availability of resources/nodes).

In a second such embodiment for improving data rebuild, a service may be configured to orchestrate extent store rebuild and maintain an estimate of how long the rebuild will take based on the amount of data to rebuild and rebuild speed. Based on the adjusted draining speed 756 of the oplog 510 (and other parameters for the PID controller 750), the technique determines how long it will take to drain the oplog 510. The technique then leverages the estimation of how long the extent store rebuild will take, e.g., as computed by the service. If the oplog draining may complete before the extent store rebuild, the technique reduces the draining speed of the oplog to reduce impact on the extent store rebuild and, more notably, on the frontend I/O workload. If the oplog draining may complete after (slower than) the extent store rebuild completes, the technique increases the draining speed so that the oplog does not lag the extent store rebuild completion. That is, the objective of the data rebuild improvement is to complete oplog draining and extent store rebuild in close temporal proximity (i.e., substantially at the same time) so as to avoid impacting frontend I/O workload performance, especially when I/O capacity increases after rebuild is complete.

Accordingly, the technique maintains the flushing speed as low as possible while ensuring that oplog rebuild does not take longer than extent store rebuild. Similar to physical usage based draining, the technique predicts (estimates) how long oplog rebuild will take based on the current draining speed 714 (notably without consideration of current oplog ingest speed 712 as new data is properly replicated anyway) and then regulates (increases or decreases) the draining speed using the PID controller 750 such that oplog rebuild finishes close to extent store rebuild. This aspect of the technique obviates the use of static maximum thresholds and facilitates more efficient and accurate draining.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor of a node, the program instructions configured to:

receive an input/output (I/O) workload at the node, the I/O workload including write accesses having data directed to a virtual disk (vdisk) of the node, the write access data cached in an operations log (oplog) of the node;

control draining of the cached data from the oplog to persistent storage of the node according to a state of the oplog;

in response to the oplog being in a static state, predict a peak storage usage of an amount of storage consumed by the oplog based on a rate of ingesting of the write access data and a rate of the draining of the cached data; and regulate the draining of the cached data such that the amount of storage consumed by the oplog approaches a predetermined peak oplog storage usage based on a pre-configured amount of consumed storage at the persistent storage.

2. The non-transitory computer readable medium of claim 1, wherein the program instructions configured to predict the peak storage usage are further configured to measure (i) a draining rate from a last episode of the oplog, and (ii) a draining rate from episodes of the oplog other than the last episode, wherein the episodes are of a predetermined size that correspond to portions of the oplog.

3. The non-transitory computer readable medium of claim 2, wherein each draining rate corresponds to a count of nullifications of records of a respective episode, wherein each record includes the cached data from a corresponding I/O workload write access.

4. The non-transitory computer readable medium of claim 1, wherein the program instructions configured to predict the peak storage usage of the are further configured to measure a reference count of episodes to live ranges of the episodes based on a reference map, wherein the episodes are of a predetermined size that correspond to portions of the oplog.

5. The non-transitory computer readable medium of claim 1, wherein the program instructions configured to predict the peak storage usage of the oplog are further configured to measure a rate of fragment addition, wherein the fragment corresponds to a contiguous region of data.

6. The non-transitory computer readable medium of claim 1, wherein the program instructions are further configured to, in response to the oplog being in an idle state wherein the I/O workload lacks random write operations for an idle time period, regulate the draining of the cached data to increase a rate of flushing proportional to a length of the idle time period.

7. The non-transitory computer readable medium of claim 6, wherein the idle time period is a sliding window.

8. The non-transitory computer readable medium of claim 6, wherein the program instructions are further configured to, in response to the oplog being in the idle state, account for types of I/O workload operations including (i) sequential writes, (ii) random writes and (iii) reads, and wherein the draining of the cached data is paused during periods of I/O operations that impact the oplog including random writes.

9. The non-transitory computer readable medium of claim 1, wherein the program instructions are further configured to, in response to the oplog being in a rebuild state wherein the oplog and the persistent storage are being rebuilt, regulate the oplog draining such that completion of the rebuild of the oplog and the persistent storage occur in close temporal proximity.

10. The non-transitory computer readable medium of claim 9, wherein the program instructions are further configured to, in response to the oplog being in the rebuild state, predict a length of time for the oplog rebuild and configure a controller to regulate the draining of the oplog.

11. The non-transitory computer readable medium of claim 10, wherein the controller is a proportional-integral-derivative (PID) controller.

12. The non-transitory computer readable medium of claim 1, wherein the program instructions are further configured to reclaim storage from the oplog by garbage collecting the drained cached data.

13. A method comprising:

receiving an input/output (I/O) workload at a compute node, the I/O workload including write accesses having data directed to a virtual disk (vdisk) of the node, the write access data cached in an operations log (oplog) of the node;

controlling draining of the cached data from the oplog to persistent storage of the node according to a state of the oplog;

in response to the oplog being in a static state, predicting a peak storage usage of an amount of storage consumed by the oplog based on a rate of ingesting of the write access data and a rate of the draining of the cached data; and regulating the draining of the cached data such that the amount of storage consumed by the oplog approaches a predetermined peak oplog storage usage based on a pre-configured amount of consumed storage at the persistent storage.

14. The method of claim 13, wherein predicting the peak storage usage further comprises measuring (i) a draining rate from a last episode of the oplog, and (ii) a draining rate from episodes of the oplog other than the last episode, wherein the episodes are of a predetermined size that correspond to portions of the oplog.

15. The method of claim 14, wherein each draining rate corresponds to a count of nullifications of records of a respective episode, wherein each record includes the cached data from a corresponding I/O workload write access.

16. The method of claim 13, wherein predicting the peak storage usage further comprises measuring a reference count of episodes to live ranges of the episodes based on a reference map, wherein the episodes are of a predetermined size that correspond to portions of the oplog.

17. The method of claim 13, wherein predicting the peak storage usage of the oplog further comprises measuring a rate of fragment addition, wherein the fragment corresponds to a contiguous region of data.

18. The method of claim 13, further comprising, in response to the oplog being in an idle state wherein the I/O workload lacks random write operations for an idle time period, regulating the draining of the cached data to increase a rate of flushing proportional to a length of the idle time period.

19. The method of claim 18, wherein the idle time period is a sliding window.

20. The method of claim 18, further comprising, in response to the oplog being in the idle state, accounting for types of I/O workload operations including (i) sequential writes, (ii) random writes and (iii) reads, and wherein the draining of the cached data is paused during periods of I/O operations that impact the oplog including random writes.

21. The method of claim 13, further comprising, in response to the oplog being in a rebuild state wherein the oplog and the persistent storage are being rebuilt, regulating the oplog draining such that completion of the rebuild of the oplog and the persistent storage occur in close temporal proximity.

22. The method of claim 21, further comprising, in response to the oplog being in the rebuild state, predicting a length of time for the oplog rebuild and configuring a controller to regulate the draining of the oplog.

23. The method of claim 22, wherein the controller is a proportional-integral-derivative (PID) controller.

24. The method of claim 13, further comprising reclaiming storage from the oplog by garbage collecting the drained cached data.

25. An apparatus comprising:

a node having a processor and persistent storage, wherein the processor is configured to execute program instructions configured to:

receive an input/output (I/O) workload at the node, the I/O workload including write accesses having data directed to a virtual disk (vdisk) of the node, the write access data cached in an operations log (oplog) of the node;

control draining of the cached data from the oplog to the persistent storage according to a state of the oplog;

in response to the oplog being in a static state, predict a peak storage usage of an amount of storage consumed by the oplog based on a rate of ingesting of the write access data and a rate of the draining of the cached data; and regulate the draining of the cached data such that the amount of storage consumed by the oplog approaches a predetermined peak oplog storage usage based on a pre-configured amount of consumed storage at the persistent storage.

26. The apparatus of claim 25, wherein the program instructions configured to predict the peak storage usage are further configured to measure (i) a draining rate from a last episode of the oplog, and (ii) a draining rate from episodes of the oplog other than the last episode, wherein the episodes are of a predetermined size that correspond to portions of the oplog.

27. The apparatus of claim 26, wherein each draining rate corresponds to a count of nullifications of records of a respective episode, wherein each record includes the cached data from a corresponding I/O workload write access.

28. The apparatus of claim 25, wherein the program instructions configured to predict the peak storage usage are further configured to measure a reference count of episodes to live ranges of the episodes based on a reference map, wherein the episodes are of a predetermined size that correspond to portions of the oplog.

29. The apparatus of claim 25, wherein the program instructions configured to predict the peak storage usage of the oplog are further configured to measure a rate of fragment addition, wherein the fragment corresponds to a contiguous region of data.

30. The apparatus of claim 25, wherein the program instructions are further configured to, in response to the oplog being in an idle state wherein the I/O workload lacks random write operations for an idle time period, regulate the draining of the cached data to increase a rate of flushing proportional to a length of the idle time period.

31. The apparatus of claim 30, wherein the idle time period is a sliding window.

32. The apparatus of claim 30, wherein the program instructions are further configured to, in response to the oplog being in the idle state, account for types of I/O workload operations including (i) sequential writes, (ii) random writes and (iii) reads, and wherein the draining of the cached data is paused during periods of I/O operations that impact the oplog including random writes.

33. The apparatus of claim 25, wherein the program instructions are further configured to, in response to the oplog being in a rebuild state wherein the oplog and the persistent storage are being rebuilt, regulate the oplog draining such that completion of the rebuild of the oplog and the persistent storage occur in close temporal proximity.

34. The apparatus of claim 33, wherein the program instructions are further configured to, in response to the oplog being in the rebuild state, predict a length of time for the oplog rebuild and configure a controller to regulate the draining of the oplog.

35. The apparatus of claim 34, wherein the controller is a proportional-integral-derivative (PID) controller.

36. The apparatus of claim 25, wherein the program instructions are further configured to reclaim storage from the oplog by garbage collecting the drained cached data.

* * * * *